(12) United States Patent
Orita

(10) Patent No.: US 8,670,869 B2
(45) Date of Patent: Mar. 11, 2014

(54) ROBOT CONTROLLER

(75) Inventor: Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 13/479,885

(22) Filed: May 24, 2012

(65) Prior Publication Data

US 2012/0303161 A1    Nov. 29, 2012

(30) Foreign Application Priority Data

May 25, 2011  (JP) ................. 2011-117462
May 25, 2011  (JP) ................. 2011-117463
May 25, 2011  (JP) ................. 2011-117464
Jun. 29, 2011  (JP) ................. 2011-144887

(51) Int. Cl.
*G06F 19/00*     (2011.01)
*G05B 19/04*     (2006.01)

(52) U.S. Cl.
USPC ........... 700/262; 700/246; 700/247; 700/245; 700/249; 700/250

(58) Field of Classification Search
USPC ......... 318/568.1, 11, 12, 16, 17, 2, 22; 414/4, 414/730; 700/245, 246, 247, 249, 250, 251, 700/253, 254, 258, 260, 261, 262, 275, 88
See application file for complete search history.

(56) References Cited

U.S. PATENT DOCUMENTS

| | | | |
|---|---|---|---|
| 6,317,651 B1 * | 11/2001 | Gerstenberger et al. ...... | 700/245 |
| 6,456,901 B1 * | 9/2002 | Xi et al. ........................ | 700/245 |
| 6,583,869 B1 * | 6/2003 | Sheridan ........................ | 356/153 |
| 8,406,989 B1 * | 3/2013 | Bhattacharyya et al. ..... | 701/301 |
| 8,463,433 B2 * | 6/2013 | Nagasaka ..................... | 700/245 |
| 2012/0029699 A1 * | 2/2012 | Jing et al. ...................... | 700/263 |
| 2012/0095598 A1 * | 4/2012 | Nagasaka ..................... | 700/260 |
| 2012/0150499 A1 * | 6/2012 | Todorov ......................... | 703/2 |

FOREIGN PATENT DOCUMENTS

JP     2006-150567      6/2006

OTHER PUBLICATIONS

Nakamura, et al., "Inverse Kinematic Solutions with Singularity Robustness for Robot Manipulator Control", Journal of Dynamic Systems, Measurement and Control, vol. 108, Sep. 1986. pp. 163-171. (Nine Pages).

* cited by examiner

*Primary Examiner* — Ian Jen
(74) *Attorney, Agent, or Firm* — Rankin, Hill & Clark LLP

(57) ABSTRACT

An element 22 which determines a manipulation amount for controlling a motion state of each joint 4 of a robot 1 calculates a pseudo inverse matrix A* used for calculating the manipulation amount, using a value of an adjustment parameter k determined so that an absolute value of a determinant DET is equal to or more than a predetermined threshold. Setting a provisional value of the adjustment parameter k by gradually increasing the provisional value from a predetermined initial value, calculating the determinant DET using the set provisional value, and determining whether the absolute value of the calculated determinant DET is equal to or more than the predetermined threshold is repeated, and the provisional value of the adjustment parameter k when the determination result is true is determined as the value of the adjustment parameter k used for the calculation of the pseudo inverse matrix A*.

5 Claims, 5 Drawing Sheets

ROBOT CONTROLLER

BACKGROUND OF THE INVENTION

1. Field of the Invention

The present invention relates to a robot controller for a robot including a plurality of joints.

2. Description of the Related Art

Typically, a robot controller for a robot which performs a required motion by moving a plurality of joints sequentially determines a manipulation amount (control input) for controlling a motion state of each joint (such as a displacement amount of each joint or a drive force of each joint), and controls the motion state of each joint via an actuator such as an electric motor according to the manipulation amount.

In such robot control, it is often necessary to calculate a pseudo inverse matrix of a matrix (generally, a matrix that is not invertible), such as a Jacobian matrix, representing a linear map, and perform a calculation process that uses the pseudo inverse matrix, in order to determine the manipulation amount.

For example, Japanese Patent Application Laid-Open No. 2006-150567 (hereafter referred to as Patent Document 1) describes a technique of determining a desired angular velocity of each joint of a robot from a ZMP velocity by using a pseudo inverse matrix of a ZMP Jacobian matrix that associates an angular change of each joint of the robot with a ZMP change.

Let A be a matrix whose pseudo inverse matrix is to be calculated. The pseudo inverse matrix (hereafter denoted by $A^*$) of the matrix A is typically calculated according to the following equation (1). Note that the superscript "T" denotes transposition.

$$A^* = A^T \cdot (A \cdot A^T)^{-1} \quad (1)$$

However, in the case where a magnitude of a determinant $\det(A \cdot A^T)$ of a matrix $(A \cdot A^T)$ in the right side of the equation (1) is extremely small such as zero or close to zero, the calculation result of the right side of the equation (1) diverges, as a result of which the correct pseudo inverse matrix $A^*$ cannot be calculated.

To prevent this, there is a known method of calculating the pseudo inverse matrix $A^*$ according to the following equation (2) as proposed in, for example, Nakamura Y. and Hanafusa H., "Inverse Kinematic Solutions with Singularity Robustness for Robot Manipulator Control", Journal of Dynamic Systems, Measurement, and Control, Vol. 108, September (1986), pp. 163-171 (hereafter referred to as Non-patent Document 1).

$$A^* = A^T \cdot (A \cdot A^T + k \cdot I)^{-1} \quad (2)$$

In the equation (2), k is an adjustment parameter that is set to an appropriate real number equal to or more than zero in order to prevent a magnitude of a determinant $\det(A \cdot A^T + k \cdot I)$ (hereafter denoted by DET) of a matrix $(=A \cdot A^T + k \cdot I)$ inside the parentheses in the right side of the equation (2) from becoming excessively small. I is a unit matrix.

In the case of calculating the pseudo inverse matrix $A^*$ according to the equation (2), the magnitude of the determinant DET can be prevented from becoming excessively small, by appropriately setting the value of the adjustment parameter k. As a result, the pseudo inverse matrix $A^*$ can be kept from diverging.

SUMMARY OF THE INVENTION

The appropriate value of the adjustment parameter k for preventing the magnitude of the determinant DET ($\equiv \det(A \cdot A^T + k \cdot I)$) from becoming excessively small changes depending on the matrix A. Moreover, the magnitude of the determinant DET changes nonlinearly with the change of the value of k.

Therefore, the value of the adjustment parameter k for enabling the absolute value of the determinant DET to be equal to or more than a predetermined threshold (not excessively small) is usually determined in an exploratory manner.

For example, a process of setting a provisional value of k by gradually increasing the provisional value by a predetermined increment from a predetermined initial value, calculating the determinant DET using the set provisional value, and determining whether or not the absolute value of the calculated determinant DET is equal to or more than the predetermined threshold is repeatedly performed. The provisional value of k in the case where the result of the determination is true is determined as the value of the adjustment parameter k used for calculating the pseudo inverse matrix $A^*$ according to the equation (2).

According to the findings of the inventor of the present application, however, the following problems arise if the increment of the provisional value of k is fixed in this exploratory determination process of the value of the adjustment parameter k.

The pseudo inverse matrix $A^*$ is used in the calculation process of sequentially determining the manipulation amount for controlling the motion state of each joint of the robot. It is therefore desirable to speedily determine the value of the adjustment parameter k used for calculating the pseudo inverse matrix $A^*$, in each control cycle of the controller.

However, if the increment of the provisional value of k is set to a relatively large value in order to enable the appropriate value of k to be determined as speedily as possible, the value of k determined in each control cycle of the robot controller tends to change frequently. As a result, the pseudo inverse matrix $A^*$ calculated using the value of k in each control cycle tends to change discontinuously, leading to a discontinuous change of the manipulation amount for controlling the motion state of each joint of the robot. This causes a problem that the motion smoothness of the robot is impaired.

Conversely, if the increment of the provisional value of k is set to a relatively small value in order to suppress the frequent change of the value of k determined in each control cycle, there is a possibility that it takes too long to eventually determine the appropriate value of k, making it impossible to determine the appropriate value of k within the control cycle of the robot controller. This causes a problem that it is difficult to shorten the control cycle of the robot controller, and so is difficult to move the robot quickly.

The present invention was made in view of the background described above, and has an object of providing a device capable of, in the case of determining a manipulation amount for controlling a motion state of each joint of a robot by a calculation process that uses a pseudo inverse matrix, efficiently determining an appropriate value of a parameter used for calculating the pseudo inverse matrix in a short time.

To achieve the stated object, a robot controller according to the present invention is a robot controller for a robot which includes a plurality of link elements connected together via a plurality of joints, the robot controller comprising: a basic manipulation amount determination element configured to sequentially determine a basic manipulation amount vector $\uparrow a$ according to at least a desired value of a predetermined type of state quantity of the robot, the basic manipulation amount vector $\uparrow a$ being a vector representing a manipulation amount for controlling the predetermined type of state quantity of the robot to the desired value, and being composed of M components where M is an integer equal to or more than 1; a joint manipulation amount determination element configured to sequentially determine a joint manipulation amount vector ↑b by multiplying the determined basic manipulation amount vector ↑a by a pseudo inverse matrix A* of a matrix A defined by the following equation (3), the joint manipulation amount vector ↑b being a vector representing a manipulation amount for controlling a motion state of each joint of the robot, being composed of N components where N is an integer such that N≥M, and having a relation of a linear map shown by the following equation (3) with the basic manipulation amount vector ↑a, the equation (3) being $$\uparrow a = A \cdot \uparrow b \quad (3); \text{ and}$$

a joint control element configured to control the motion state of each joint of the robot via an actuator, according to at least the determined joint manipulation amount vector ↑b, wherein the joint manipulation amount determination element includes: a matrix determination element configured to determine the matrix A according to at least a current motion state of each joint of the robot; a pseudo inverse matrix calculation element configured to calculate the pseudo inverse matrix A* according to the following equation (4), using the determined matrix A, a weight coefficient matrix W set beforehand which is a diagonal matrix, and a value of an adjustment parameter k where k is a real number equal to or more than 0; and an adjustment parameter determination element configured to determine the value of the adjustment parameter k used for calculation of the equation (4) so that an absolute value of a determinant DET expressed by the following equation (5) is equal to or more than a predetermined threshold, the equations (4) and (5) being respectively $$A^* = W^{-1} \cdot A^T \cdot (A \cdot W^{-1} \cdot A^T + k \cdot I)^{-1} \quad (4)$$

$$DET = det(A \cdot W^{-1} \cdot A^T + k \cdot I) \quad (5), \text{ and}$$

wherein the adjustment parameter determination element is configured to: repeatedly perform a process of setting a provisional value of the adjustment parameter k by gradually increasing the provisional value from a predetermined initial value, calculating the determinant DET using the set provisional value, and determining whether or not the absolute value of the calculated determinant DET is equal to or more than the predetermined threshold; determine the provisional value of the adjustment parameter k in the case where a result of the determination is true, as the value of the adjustment parameter k used for the calculation of the equation (4); and set an increment of the provisional value of the adjustment parameter k in the case where the result of the determination is false, to a value proportional to an n-th root of an absolute value of an error between the absolute value of the determinant DET calculated using the provisional value before the increment and the predetermined threshold, where n is an order of $A \cdot W^{-1} \cdot A^T$ (first invention).

In the equation (4), I is a unit matrix. The weight coefficient matrix W adjusts responsiveness, sensitivity, or the like of a change in the predetermined type of state quantity according to the control of the motion state of each joint. The weight coefficient matrix W may be a unit matrix. In the case where a unit matrix is employed as the weight coefficient matrix W, the equations (4) and (5) are respectively equivalent to the following equations (4a) and (5a).

$$A^* = A^T \cdot (A \cdot A^T + k \cdot I)^{-1} \quad (4a)$$

$$DET = det(A \cdot A^T + k \cdot I) \quad (5a)$$

Hence, the first invention includes a mode in which the pseudo inverse matrix A* and the determinant DET are calculated respectively according to the equations (4a) and (5a). The same applies to the below-mentioned fifth invention.

According to the first invention, the basic manipulation amount determination element sequentially determines the basic manipulation amount vector ↑a for controlling the predetermined type of state quantity of the robot to the desired value, according to at least the desired value of the predetermined type of state quantity. The basic manipulation amount vector ↑a is a vector that becomes a function value of the joint manipulation amount vector ↑b by the linear map expressed by the equation (3).

In this specification, the symbol "↑" is used to express a vector (column vector).

The joint manipulation amount determination element sequentially determines the joint manipulation amount vector ↑b from the basic manipulation amount vector ↑a. In more detail, the joint manipulation amount determination element determines the matrix A and the adjustment parameter k respectively by the matrix determination element and the adjustment parameter determination element.

The joint manipulation amount determination element further determines the pseudo inverse matrix A* by calculating the equation (4) using the matrix A, the adjustment parameter k, and the weight coefficient matrix W by the pseudo inverse matrix calculation element.

The joint manipulation amount determination element then determines the joint manipulation amount vector ↑b, by multiplying the basic manipulation amount vector ↑a by the pseudo inverse matrix A*.

The joint control element controls the motion state of each joint of the robot via the actuator, according to the joint manipulation amount vector ↑b determined as described above. Thus, the motion state of each joint of the robot is controlled so as to control the predetermined type of state quantity to the desired value.

In such control, the joint manipulation amount determination element determines the value of the adjustment parameter k by the adjustment parameter determination element, in order to calculate the pseudo inverse matrix A* used for determining the joint manipulation amount vector ↑b at each instant.

In more detail, the adjustment parameter determination element repeatedly performs the process of setting the provisional value of the adjustment parameter k by gradually increasing the provisional value from the predetermined initial value, calculating the determinant DET using the set provisional value, and determining whether or not the absolute value of the calculated determinant DET is equal to or more than the predetermined threshold (>0).

The adjustment parameter determination element determines the provisional value of k in the case where the result of the determination is true, as the value of the adjustment parameter k used for the calculation of the equation (4).

Thus, the value of the adjustment parameter k such that the absolute value of the determinant DET is equal to or more than the predetermined threshold is determined in an exploratory manner.

According to the findings of the inventor of the present application, the determinant DET changes in proportion to the n-th power of the value of k, where n is the order of $A \cdot W^{-1} \cdot A^T$.

In view of this, in the first invention, the adjustment parameter determination element sets the increment of the provisional value of k in the case where the result of the determination is false, to a value proportional to the n-th root (n is the order of $A \cdot W^{-1} \cdot A^T$) of the absolute value of the error between the absolute value of the determinant DET calculated using the provisional value before the increment and the predetermined threshold.

Therefore, according to the first invention, the appropriate value of the adjustment parameter k (the value of k such that the absolute value of DET is equal to or more than the predetermined threshold) used for calculating the pseudo inverse matrix A* can be efficiently determined in a short time in each control cycle of the controller. In addition, according to the first invention, the pseudo inverse matrix A* can be changed smoothly in each control cycle of the controller, allowing the joint manipulation amount vector ↑b to be determined so as to smoothly change the motion state of each joint of the robot.

Moreover, according to the first invention, the responsiveness, sensitivity, or the like of the change of the predetermined type of state quantity according to the control of the motion state of each joint can be adjusted by the weight coefficient matrix W.

In the first invention, various state quantities are applicable as the predetermined type of state quantity. For example, the predetermined type of state quantity may include at least one of a motion state quantity of a specific part of the robot and an external force acting on the robot (second invention).

According to the second invention, the motion state quantity of the specific part of the robot (e.g. a spatial position or posture of the specific part, or a change velocity of the spatial position or posture) or the external force acting on the robot (e.g. a contact force such as a floor reaction force) can be controlled to the desired value. The specific part may be an arbitrary link element of the robot. Alternatively, the specific part may be an overall center of gravity of the robot.

In the first or second invention, for example, the following manipulation amount vectors may be employed as the basic manipulation amount vector ↑a and the joint manipulation amount vector ↑b.

As an example, the basic manipulation amount vector ↑a is a vector composed of a manipulation amount component defining a motion state of a specific part of the robot, and the joint manipulation amount vector ↑b is a vector composed of a manipulation amount component defining a displacement amount of each joint of the robot (third invention).

As another example, the basic manipulation amount vector ↑a is a vector composed of a manipulation amount component defining an external force acting on the robot, and the joint manipulation amount vector ↑b is a vector composed of a manipulation amount component defining a drive force of each joint of the robot (fourth invention).

According to the third invention, the desired motion of the robot can be realized by controlling the displacement amount of each joint of the robot (i.e. position control). According to the fourth invention, the desired motion of the robot can be realized by controlling the drive force of each joint of the robot (i.e. force control).

The pseudo inverse matrix that needs to be calculated in the calculation process in the robot controller is not limited to the pseudo inverse matrix A* of the matrix A directly defining a relation between the basic manipulation amount vector ↑a and the joint manipulation amount vector ↑b.

For instance, there may be a need to calculate a pseudo inverse matrix of a matrix representing a linear map, in an intermediate calculation process in the process of determining the manipulation amount for controlling the motion state of each joint of the robot.

This being so, the pseudo inverse matrix determination technique described with regard to the first invention is also applicable to an instance of calculating a pseudo inverse matrix of a matrix other than the matrix A in the first invention.

That is, in a more generalized mode, a robot controller according to the present invention is a robot controller for a robot which includes a plurality of link elements connected together via a plurality of joints, the robot controller comprising: a joint manipulation amount determination element configured to sequentially determine a manipulation amount for controlling a motion state of each joint of the robot, by a calculation process that uses a pseudo inverse matrix A* of a matrix A representing a linear map; and a joint control element configured to control the motion state of each joint of the robot via an actuator, according to the determined manipulation amount, wherein the joint manipulation amount determination element includes: a pseudo inverse matrix calculation element configured to calculate the pseudo inverse matrix A* according to the equation (4), using the matrix A, a weight matrix W set beforehand which is a diagonal matrix, and a value of an adjustment parameter k where k is a real number equal to or more than 0; and an adjustment parameter determination element configured to determine the value of the adjustment parameter k used for calculation of the equation (4) so that an absolute value of a determinant DET expressed by the equation (5) is equal to or more than a predetermined threshold, wherein the adjustment parameter determination element is configured to: repeatedly perform a process of setting a provisional value of the adjustment parameter k by gradually increasing the provisional value from a predetermined initial value, calculating the determinant DET using the set provisional value, and determining whether or not the absolute value of the calculated determinant DET is equal to or more than the predetermined threshold; determine the provisional value of the adjustment parameter k in the case where a result of the determination is true, as the value of the adjustment parameter k used for the calculation of the equation (4); and set an increment of the provisional value of the adjustment parameter k in the case where the result of the determination is false, to a value proportional to an n-th root of an absolute value of an error between the absolute value of the determinant DET calculated using the provisional value before the increment and the predetermined threshold, where n is an order of $A \cdot W^{-1} \cdot A^T$ (fifth invention).

According to the fifth invention, the joint manipulation amount determination element sequentially determines the manipulation amount for controlling the motion state of each joint of the robot, by the calculation process that uses the pseudo inverse matrix A* of the matrix A representing the linear map.

In more detail, the joint manipulation amount determination element determines the pseudo inverse matrix A* by calculating the equation (4) using the matrix A, the adjustment parameter k, and the weight coefficient matrix W by the pseudo inverse matrix calculation element. The joint manipulation amount determination element further determines the manipulation amount for controlling the motion state of each joint of the robot, by the calculation process that uses the pseudo inverse matrix A*.

The joint control element controls the motion state of each joint of the robot via the actuator, according to the manipulation amount determined as described above. Thus, the motion state of each joint of the robot is controlled.

In such control, the joint manipulation amount determination element determines the value of the adjustment parameter k by the adjustment parameter determination element, in order to calculate the pseudo inverse matrix A* used for determining the manipulation amount at each instant.

This process of the adjustment parameter determination element is performed in the same way as in the first invention. Therefore, according to the fifth invention, the appropriate value of the adjustment parameter k (the value of k such that the absolute value of DET is equal to or more than the predetermined threshold) used for calculating the pseudo inverse matrix A* can be efficiently determined in a short time in each control cycle of the controller, as in the first invention. In addition, according to the fifth invention, the pseudo inverse matrix A* can be changed smoothly in each control cycle of the controller, allowing the manipulation amount to be determined so as to smoothly change the motion state of each joint of the robot, as in the first invention.

Moreover, according to the fifth invention, the responsiveness, sensitivity, or the like of the change of the motion of the robot according to the control of the motion state of each joint can be adjusted by the weight coefficient matrix W.

Note that the robot in the present invention described above may be any of a robot fixed in place and a mobile robot.

DESCRIPTION OF THE PREFERRED EMBODIMENTS

First Embodiment

The following describes a first embodiment of the present invention with reference to FIGS. 1 to 4.

Figure 1:
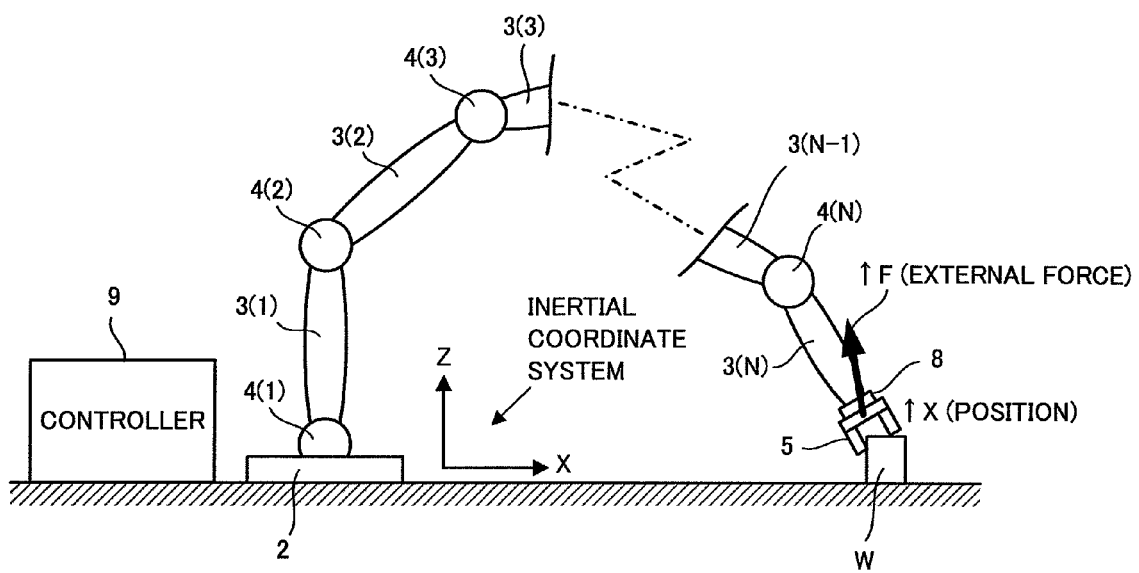
FIG. 1 is a diagram showing a schematic structure of a robot in an embodiment of the present invention.

In FIG. 1, a robot 1 exemplified in this embodiment is a working robot fixed in place. The robot 1 includes a plurality of (N) arm-like element links 3(1) to 3(N) connected one by one from a base 2 placed on a floor, and a plurality of (N) joints 4(1) to 4(N) disposed at connections of the base 2 and the element links 3(1) to 3(N). A hand 5 is attached to a distal end of the most distal element link 3(N).

The number N of the element links 3(1) to 3(N) and the joints 4(1) to 4(N) is six, as an example. However, the number N is not limited to six, and may be another number (e.g. four, seven, etc.).

In the following description, each of the element links 3(1) to 3(N) is generically referred to as an element link 3($i$) ($i$=1, 2, ..., N) or an element link 3, when there is no need to distinguish the element links 3(1) to 3(N) from each other.

Likewise, each of the joints 4(1) to 4(N) is generically referred to as a joint 4($i$) ($i$=1, 2, ..., N) or a joint 4, when there is no need to distinguish the joints 4(1) to 4(N) from each other.

In this embodiment, each joint 4 is a joint of a known structure having rotational freedom about one axis, though not shown in detail. Each joint 4 is connected to a joint actuator 6 (shown in FIG. 2) provided in the robot 1 in correspondence with the joint 4 so that a drive force (rotating drive force) is transmitted from the joint actuator 6 through a power transmission mechanism including a reducer not shown. For example, each joint actuator 6 is an actuator composed of an electric motor.

The hand 5 is spatially moved by driving each joint 4 by the corresponding joint actuator 6. The motion of the hand 5 enables a work, such as moving an object W contacted by the hand 5, to be performed.

Each joint actuator 6 is not limited to an electric motor, and may be composed of a hydraulic actuator. Besides, each joint actuator 6 is not limited to a rotational actuator, and may be a linear actuator.

Figure 2:
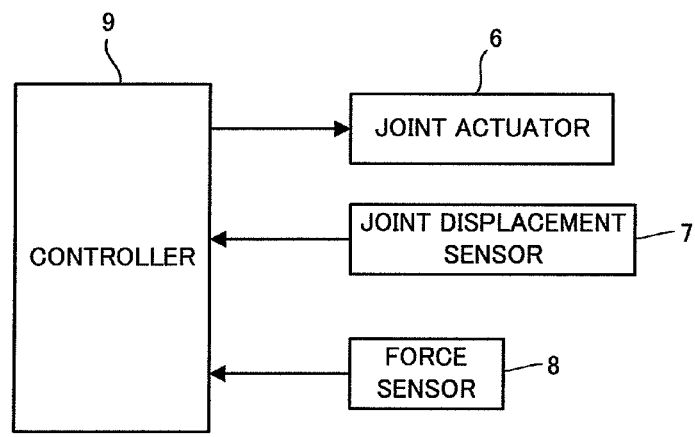
FIG. 2 is a block diagram showing a structure relating to control of the robot shown in FIG. 1.

As shown in FIG. 2, a structure for motion control of the robot 1 includes a joint displacement sensor 7 for measuring a displacement amount (rotational angle in this embodiment) of each joint 4, a force sensor 8 for measuring an external force acting on the hand 5, and a controller 9.

The joint displacement sensor 7 is composed of a sensor such as a rotary encoder or a potentiometer mounted at each joint 4 (or each joint actuator 6). The joint displacement sensor 7 outputs a signal corresponding to the displacement amount (rotational angle) of each joint 4, to the controller 9.

The force sensor 8 is composed of, for example, a six-axis force sensor disposed between the distal end of the element link 3(N) and the hand 5. The force sensor 8 outputs a signal corresponding to a force (a translational force and a moment) acting on the hand 5, to the controller 9. The force sensor 8 may be a sensor for detecting only a force of a specific component (e.g. a translational force in a direction of one axis).

Figure 3:
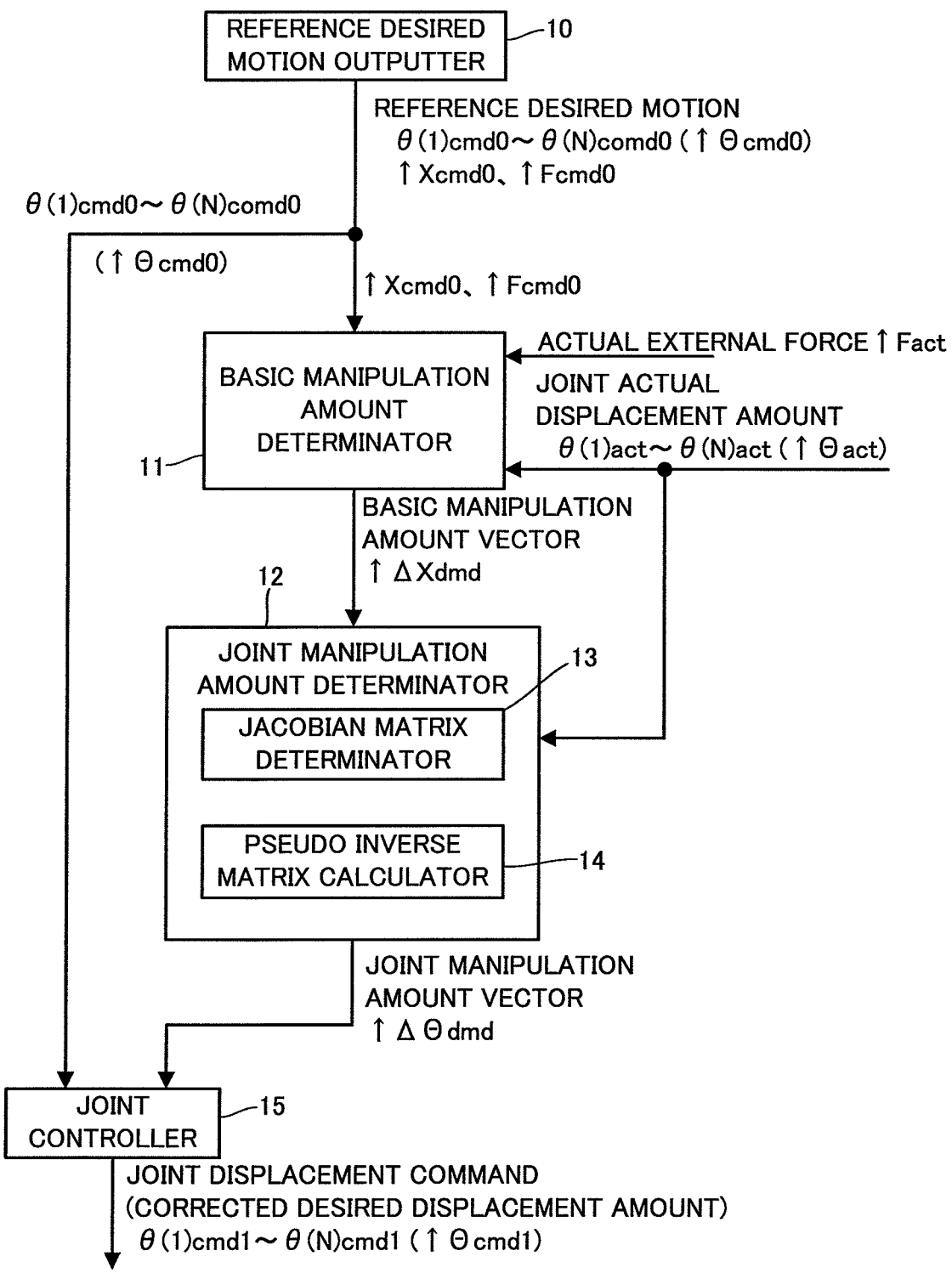
FIG. 3 is a block diagram showing functions of a controller shown in FIG. 2 in a first embodiment.

The controller 9 is an electronic circuit unit including a CPU, a RAM, a ROM, an interface circuit, and the like not shown. As shown in FIG. 3, the controller 9 includes, as functions realized by an implemented program, a hardware structure, or the like: a reference desired motion outputter 10 which outputs a reference desired motion of the robot 1; a basic manipulation amount determinator 11 which determines a basic manipulation amount vector ↑ΔXdmd as a control input (manipulation amount) for controlling an actual value (actual state quantity) of a predetermined type of state quantity of the robot 1 to a required desired value (i.e. for causing the actual value to follow the required desired value); a joint manipulation amount determinator 12 which determines a joint manipulation amount vector ↑ΔΘdmd as a control input (manipulation amount) for controlling a displacement amount (rotational angle in this embodiment) of each joint 4, from the basic manipulation amount vector ↑ΔXdmd; and a joint controller 15 which determines, as eventual command values (hereafter referred to as joint displacement commands) of the respective displacement amounts of the joints 4(1) to 4(N), corrected desired displacement amounts θ(1)cmd1 to θ(N)cmd1 obtained by correcting, by the joint manipulation amount vector ↑ΔΘdmd, reference desired values θ(1)cmd0 to θ(N)cmd0 (hereafter referred to as reference desired displacement amounts θ(1)cmd0 to θ(N)cmd0) of the displacement amounts of the joints 4(1) to 4(N) defined by the reference desired motion, and controls each joint actuator 6 via a drive circuit not shown so that respective actual displacement amounts (actual displacement amounts) of the joints 4(1) to 4(N) follow the joint displacement commands θ(1)cmd1 to θ(N)cmd1. By executing the processes of these functional units sequentially in predetermined control cycles, the controller 9 performs motion control of the robot 1.

The following describes the control process of the controller 9 including the detailed process of each of the functional units, using an example where the robot 1 performs a work of moving the object W by the hand 5.

In each control cycle of the controller 9, the reference desired motion outputter 10 outputs the reference desired motion of the robot 1. The reference desired motion is teaching data generated beforehand in order to cause the robot 1 to perform the required work.

For example, the reference desired motion includes trajectories of the reference desired displacement amounts θ(1)cmd0 to θ(N)cmd0 of the N joints 4(1) to 4(N) of the robot 1, a trajectory of a reference desired hand position ↑Xcmd0 which is a reference desired position of a position ↑X of the hand 5, and a trajectory of a reference desired hand external force ↑Fcmd0 which is a reference desired value of an external force ↑F (contact force) acting on the hand 5 from the object W contacted by the hand 5.

Note that the term "trajectory" means time series of an instantaneous value. In the following description, a vector (column vector) formed by arranging the reference desired displacement amounts θ(1)cmd0 to θ(N)cmd0 of the N joints 4(1) to 4(N) of the robot 1 is referred to as a reference desired displacement amount vector ↑Θcmd0 [θ(1)cmd0, θ(2)cmd0, . . . , θ(N)cmd0]).

The constituents of the reference desired motion are stored in a storage device of the controller 9 beforehand, or provided to the controller 9 from outside by wireless communication. The reference desired motion outputter 10 sequentially outputs the constituents of the reference desired motion read from the storage device or received from outside.

The reference desired hand position ↑Xcmd0 is more specifically a desired spatial position of a representative point (point fixed with respect to the hand 5) of the hand 5. The reference desired hand position ↑Xcmd0 is expressed as a three-component position vector (column vector) in an inertial coordinate system (see FIG. 1) set beforehand as a coordinate system for representing the position and the like. In this embodiment, the inertial coordinate system is a three-axis coordinate system (XYZ coordinate system) fixed with respect to the floor on which the robot 1 is placed.

The reference desired hand external force ↑Fcmd0 is more specifically a desired translational force (vector) acting on the hand 5 from the object W in this embodiment. The reference desired hand external force ↑Fcmd0 is expressed as a three-component vector (column vector) in the inertial coordinate system.

The trajectory of the reference desired hand position ↑Xcmd0 can be uniquely calculated from the trajectory of the combination of the reference desired displacement amounts θ(1)cmd0 to θ(N)cmd0 of the N joints 4(1) to 4(N), i.e. the trajectory of the reference desired displacement amount vector ↑Θcmd0, by geometric calculation. Accordingly, the trajectory of ↑Xcmd0 may be omitted from the constituents of the reference desired motion.

Moreover, instead of the trajectories of ↑Θcmd0, ↑Xcmd0, and ↑Fcmd0, parameters of equations defining the trajectories or the like may be included in the reference desired motion.

Next, the controller 9 executes the process of the basic manipulation amount determinator 11. The basic manipulation amount determinator 11 receives the reference desired hand position ↑Xcmd0 and the reference desired hand external force ↑Fcmd0 from among the constituents of the reference desired motion output from the reference desired motion outputter 10.

The basic manipulation amount determinator 11 also receives measured values of respective actual displacement amounts θ(1)act to θ(N)act of the joints 4(1) to 4(N) indicated by the output of the joint displacement sensor 7 for each joint 4, and a measured value of an actual external force ↑Fact (actual translational external force acting on the hand 5) indicated by the output of the force sensor 8.

A vector (column vector) formed by arranging the actual displacement amounts θ(i)act (i=1, 2, . . . , N) of the joints 4(1) to 4(N) of the robot 1 is hereafter referred to as an actual displacement amount vector ↑Θact [θ(1)act, θ(2)act, . . . , θ(N)act]$^T$).

Alternatively, the basic manipulation amount determinator 11 may receive the reference desired displacement amount vector ↑Θcmd0 instead of the reference desired hand position ↑Xcmd0, and calculate ↑Xcmd0 from ↑Θcmd0.

The basic manipulation amount determinator 11 determines the basic manipulation amount vector ↑ΔXdmd for controlling the actual value (actual state quantity) of the predetermined type of state quantity of the robot 1 to the required desired value (i.e. for causing the actual value to follow the required desired value), using the received data.

In this embodiment, for example, the combination of the position ↑X of the hand 5 and the external force ↑F acting on the hand 5 is used as the predetermined type of state quantity to be controlled. The basic manipulation amount vector ↑ΔXdmd determined by the basic manipulation amount determinator 11 is the amount of correction of the position ↑X of the hand 5. The basic manipulation amount vector ↑ΔXdmd is expressed as a three-component vector in the inertial coordinate system, as with the reference desired hand position ↑Xcmd0.

The basic manipulation amount determinator 11 determines the basic manipulation amount vector ↑ΔXdmd as a control input (manipulation amount) so that the actual position ↑Xact of the hand 5 and the actual external force ↑Fact acting on the hand 5 respectively follow the reference desired hand position ↑Xcmd0 and the reference desired hand external force ↑Fcmd0, in this embodiment.

In detail, the basic manipulation amount determinator 11 determines the basic manipulation amount vector ↑ΔXdmd by adding, as shown by the following equation (6), manipulation amount components ↑ΔXa and ↑ΔXb determined according to the following equations (6a) and (6b).

$$\uparrow \Delta Xdmd = \uparrow \Delta Xa + \uparrow \Delta Xb \tag{6}$$

where $$\uparrow \Delta Xa = Kp1 \cdot (\uparrow Xcmd0 - \uparrow Xact) + Kv1 \cdot (\uparrow Xcmd0' - \uparrow Xact') \tag{6a}$$

$$\uparrow \Delta Xb = Ks1 \cdot \uparrow Fcmd0 + Kc1 \cdot (\uparrow Fcmd0 - \uparrow Fact) + Ke1 \cdot \int (\uparrow Fcmd0 - \uparrow Fact) dt \tag{6b}$$

The manipulation amount component ↑ΔXa calculated according to the equation (6a) is a manipulation amount for causing the actual position ↑Xact of the hand 5 in the predetermined type of state quantity in this embodiment to follow the reference desired hand position ↑Xcmd0.

In this case, the first term in the right side of the equation (6a) is a proportional term obtained by multiplying an error between ↑Xcmd0 and ↑Xact (measured value) by a predetermined proportional gain Kp1, and the second term in the right side of the equation (6a) is a derivative term obtained by multiplying an error between a temporal change rate ↑Xcmd0' (desired translational velocity of the hand 5) of ↑Xcmd0 and a temporal change rate ↑Xact' (actual translational velocity of the hand 5) of ↑Xact by a predetermined derivative gain Kv1.

Accordingly, the manipulation amount component ↑ΔXa in this embodiment is a feedback manipulation amount determined by a PD law (proportional-derivative law) as a feedback control law so that the error between ↑Xcmd0 and ↑Xact (measured value) approaches zero.

Here, the measured value of ↑Xact used for the calculation of the equation (6a) is calculated from a measured value of the actual displacement amount vector ↑Θact of the joint 4. ↑Xcmd0' and ↑Xact' are respectively calculated from time series of ↑Xcmd0 and time series of the measured value of ↑Xact. Kp1 and Kv1 are each a predetermined scalar or diagonal matrix.

The manipulation amount component ↑ΔXb calculated according to the equation (6b) is a manipulation amount for causing the actual external force ↑Fact acting on the hand 5 in the predetermined type of state quantity in this embodiment to follow the reference desired hand external force ↑Fcmd0.

In this case, the first term in the right side of the equation (6b) is a feedforward term obtained by multiplying ↑Fcmd0 by a predetermined feedforward gain Ks1, the second term in the right side of the equation (6b) is a proportional term obtained by multiplying an error between ↑Fcmd0 and the measured value of ↑Fact by a predetermined proportional gain Kc1, and the third term in the right side of the equation (6b) is an integral term obtained by multiplying an integral of the error between ↑Fcmd0 and the measured value of ↑Fact by a predetermined integral gain Ke1.

Accordingly, the manipulation amount component ↑ΔXb in this embodiment is a manipulation amount obtained by combining a feedforward term corresponding to ↑Fcmd0 and a feedback term determined by a PI law (proportional-integral law) as a feedback control law so that the error between ↑Fcmd0 and the measured value of ↑Fact approaches zero.

Here, Ks1, Kc1, and Ke1 used for the calculation of the equation (6b) are each a predetermined scalar or diagonal matrix.

The basic manipulation amount determinator 11 determines the result of adding the manipulation amount components ↑ΔXa and ↑ΔXb determined as described above, as the basic manipulation amount vector ↑ΔXdmd.

Thus, the basic manipulation amount vector ↑ΔXdmd is determined as a manipulation amount vector functioning so that the actual position ↑Xact and the actual external force ↑Fact of the hand 5 respectively follow the reference desired hand position ↑Xcmd0 and the reference desired hand external force ↑Fcmd0.

For example, one of the manipulation amount components ↑ΔXa and ↑ΔXb may be omitted, so that the other one of the manipulation amount components ↑ΔXa and ↑ΔXb is determined as the basic manipulation amount vector ↑ΔXdmd. The basic manipulation amount vector ↑ΔXdmd may be appropriately determined according to the state quantity of the robot 1 to be controlled.

Moreover, the desired values of the position ↑X and the external force ↑F of the hand 5 may be dynamically shifted respectively from ↑Xcmd0 and ↑Fcmd0 as needed.

The manipulation amount component ↑ΔXa may be determined by a feedback control law other than the PD law, such as a proportional law. The feedback term of the manipulation amount component ↑ΔXb may be determined by a feedback control law other than the PI law, such as the proportional law.

Though this embodiment describes the case where the predetermined type of state quantity to be controlled includes the position ↑X and the external force ↑F (translational external force) of the hand 5, the state quantity may include at least one of a posture (spatial orientation) of the hand 5 and a moment component in the external force acting on the hand 5.

After executing the process of the basic manipulation amount determinator 11 as described above, the controller 9 executes the process of the joint manipulation amount determinator 12.

The joint manipulation amount determinator 12 receives the measured values (measured value of the actual displacement amount vector ↑Θact) of the actual displacement amounts θ(1)act to θ(N)act of the joints 4(1) to 4(N) indicated by the output of the joint displacement sensor 7 for each joint 4, and the basic manipulation amount vector ↑ΔXdmd determined by the basic manipulation amount determinator 11.

The joint manipulation amount determinator 12 determines the joint manipulation amount vector ↑ΔΘdmd for controlling the displacement amount of each of the joints 4(1) to 4(N), using the received data. The joint manipulation amount vector ↑ΔΘdmd in this embodiment is a vector ($\equiv [\Delta\theta(1), \Delta\theta(2), \ldots, \Delta\theta(N)]^T$) formed by arranging the correction amounts (increase/decrease manipulation amounts) Δθ(1) to Δθ(N) of the displacement amounts of the N joints 4(1) to 4(N) of the robot 1.

The joint manipulation amount determinator 12 includes a Jacobian matrix determinator 13 and a pseudo inverse matrix calculator 14, as components of its process. The joint manipulation amount determinator 12 first executes the processes of the Jacobian matrix determinator 13 and the pseudo inverse matrix calculator 14 in sequence.

The Jacobian matrix determinator 13 executes a process of determining a Jacobian matrix J as a matrix representing, by the following equation (7), a relation of a linear map between a minute change amount ↑ΔΘ(=d↑Θ/dt) per unit time of a joint displacement amount vector ↑Θ($\equiv 0[\theta(1), \theta(2), \ldots, \theta(N)]^T$) which is a vector (column vector) formed by arranging the displacement amounts θ(1) to θ(N) of the joints 4(1) to 4(N) and a corresponding change amount θΔX(=d↑X/dt) per unit time of the position ↑X of the hand 5.

$$\uparrow\Delta X = J \cdot \uparrow\Delta\Theta \quad (7)$$

Note that ↑ΔΘ is more specifically a change amount per unit time starting at a current motion state of the robot 1.

The Jacobian matrix J in this embodiment is determined by a known method using, as the starting point of the minute change (perturbation) of the joint displacement amount vector ↑Θ, the current measured values (current measured value of the actual displacement amount vector ↑Θact) of the actual displacement amounts θ(1)act to θ(N)act of the joints 4(1) to 4(N) indicated by the output of the joint displacement sensor 7 for each joint 4. For instance, the Jacobian matrix J is determined by calculating the change of the position ↑X of the hand 5 with the minute change (minute change from the current measured value of the actual displacement amount) of each component of the joint displacement amount vector ↑Θ, by using a geometric model (rigid link model) of the robot 1 or by analytical calculation.

In this embodiment, ↑ΔX is the change amount of the spatial position of the hand 5 and so is a three-dimensional vector, and ↑ΔΘ is an N-dimensional (e.g. six-dimensional in this embodiment) vector. Accordingly, the Jacobian matrix J is not a square matrix.

Next, a pseudo inverse matrix J* of the Jacobian matrix J determined by the Jacobian matrix determinator 13 as described above is calculated by the process of the pseudo inverse matrix calculator 14.

The pseudo inverse matrix calculator 14 determines a weighted pseudo inverse matrix (weighted SR-Inverse) A* calculated according to an equation that substitutes the Jacobian matrix J for the matrix A in the equation (4), as the pseudo inverse matrix J* of the Jacobian matrix J.

Figure 4:
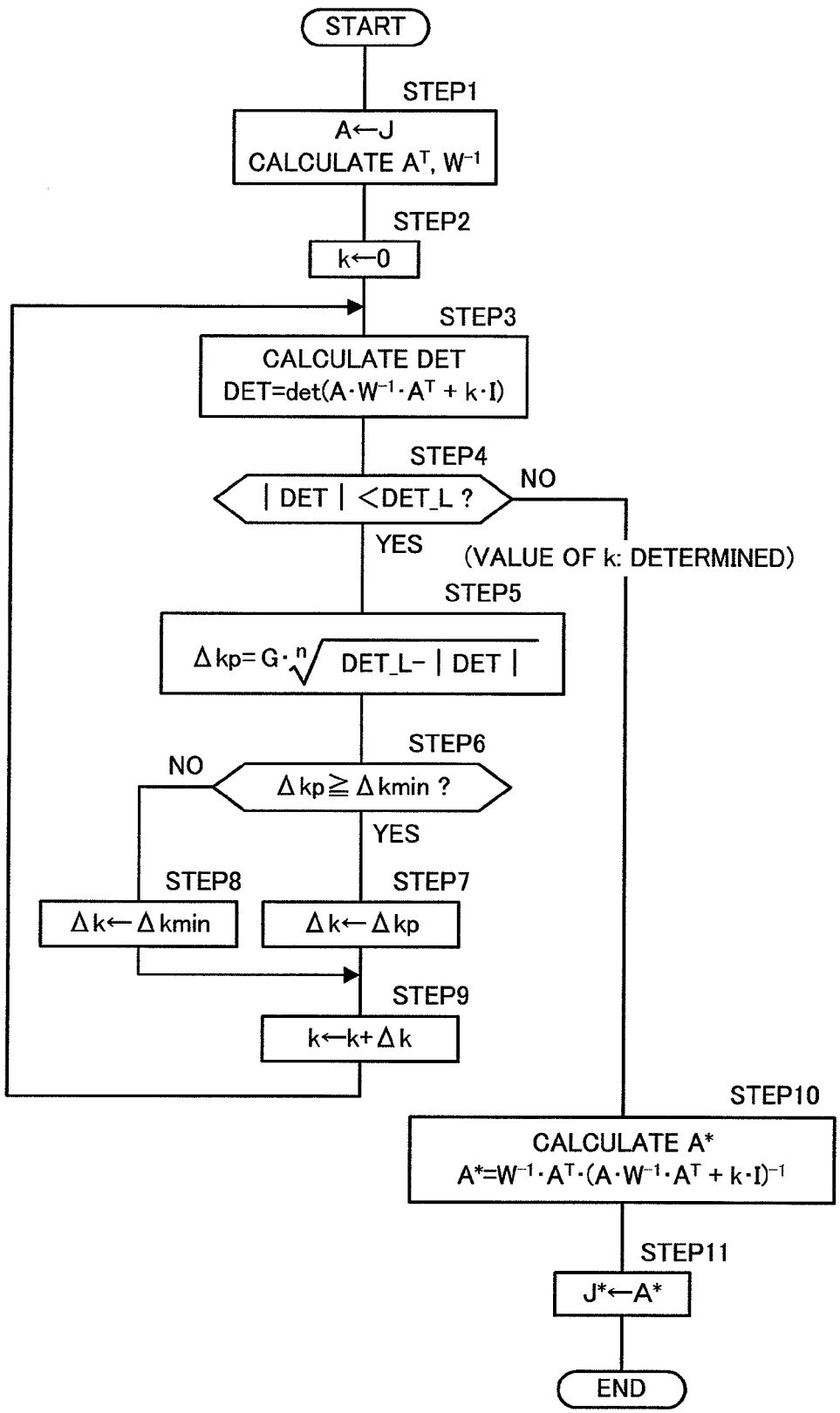
FIG. 4 is a flowchart showing a process in a pseudo inverse matrix calculator shown in FIG. 3.

In detail, the process of calculating the pseudo inverse matrix J*, including the process of determining the value of the adjustment parameter k necessary for the calculation of the equation (4), is executed as shown in the flowchart in FIG. 4.

First, in STEP 1, the Jacobian matrix J is substituted for the matrix A in the equation (4), and a transposed matrix $A^T$ of the matrix A and an inverse matrix $W^{-1}$ of the weight coefficient matrix W are calculated. The weight coefficient matrix W is a diagonal matrix whose diagonal components (weight coefficients) are set beforehand in this embodiment. Alternatively, the diagonal components of the weight coefficient matrix W may be appropriately changed according to the motion state of the robot 1.

Next, in STEP 2, zero which is a standard value of the adjustment parameter k is set as an initial provisional value of the adjustment parameter k.

Next, in STEP 3, the determinant DET is calculated using the current provisional value of the adjustment parameter k, according to the equation (5).

Next, in STEP 4, it is determined whether or not the magnitude (absolute value) of the determinant DET is less than a predetermined lower threshold DET_L (>0) (whether or not the magnitude of DET is excessively small).

In the case where the result of the determination in STEP 4 is false (the magnitude of DET is not excessively small but appropriate), STEP 10 is executed. In STEP 10, the current provisional value of k is determined as the value of the adjustment parameter k. The pseudo inverse matrix A* is then calculated using this value of the adjustment parameter k according to the equation (4). In STEP 11, the pseudo inverse matrix A* is determined as the pseudo inverse matrix J* of the Jacobian matrix J.

In the case where the result of the determination in STEP 4 is true (the magnitude of DET is excessively small), STEPS 5 to 8 (described in detail later) are executed to determine the increment Δk (>0) of the provisional value of the adjustment parameter k. In STEP 9, the provisional value of the adjustment parameter k is updated to a value obtained by increasing the current value by the increment Δk.

Subsequently, STEPS 3 to 9 are repeated until the result of the determination in STEP 4 is false. Thus, the value of the adjustment parameter k such that the determinant DET has an appropriate magnitude equal to or more than the predetermined lower threshold DET_L is determined in an exploratory manner.

The process of determining the increment Δk is described below. In the exploratory determination process of the value of the adjustment parameter k such that the determinant DET has an appropriate magnitude equal to or more than the predetermined lower threshold DET_L, a method of updating the provisional value of the adjustment parameter k using, for example, a predetermined fixed value as the increment Δk of the provisional value of the adjustment parameter k is usually employed.

In this case, however, if the increment Δk is relatively large, in a situation where the magnitude of the determinant DET calculated with k=0 is excessively small, the value of k sequentially determined in each calculation cycle of the controller 9 is a discrete value with a step size equivalent to an integral multiple of Δk, and so is likely to be excessively large relative to a minimum value of k where DET≥DET_L.

This tends to cause a variation in the difference between the magnitude of the determinant DET corresponding to the value of k sequentially determined in each control cycle of the controller 9 and the lower threshold DET_L. As a result, in the case where the joint manipulation amount vector ↑ΔΘdmd is determined in the below-mentioned manner using the pseudo inverse matrix J* determined according to the equation (4), there is a high possibility that the joint manipulation amount vector ↑ΔΘdmd changes discontinuously, impairing the motion smoothness of the robot 1.

This problem can be solved by setting the increment Δk to a sufficiently small value. In this case, however, it is likely to take long to determine the appropriate value of the adjustment parameter k such that the result of the determination in STEP 4 is false. This raises a possibility that the appropriate value of the adjustment parameter k cannot be determined within the period of each control cycle of the controller 9.

In view of this, in STEPS 5 to 8, the increment Δk of the provisional value of the adjustment parameter k is variably set according to a magnitude of an error between the magnitude of the determinant DET calculated in STEP 3 and the lower threshold DET_L.

In detail, in STEP 5, a value calculated according to the following equation (8) is set as a provisional value Δkp of the increment Δk of the adjustment parameter k.

$$\Delta kp = G \cdot (DET\_L - |DET|)^{1/n} \tag{8}$$

That is, a value (value proportional to the n-th root of the error (=DET_L−|DET|)) as a result of multiplying, by a predetermined gain G (>0), the n-th root of the error (=DET_L−|DET|) obtained by subtracting the absolute value of the determinant DET from the lower threshold DET_L is set as the provisional value Δkp of the increment Δk. Here, n is the order of the matrix $(A \cdot W^{-1} \cdot A^T)$ (n=N in this embodiment). The gain G is a predetermined constant.

The provisional value Δkp of the increment Δk is determined in this way, for the following reason. The difference between the value (the value of DET where k=0) of the determinant det $(A \cdot W^{-1} \cdot A^T)$ and the value of the determinant DET (=det$(A \cdot W^{-1} \cdot A^T + k \cdot I)$) is a function of n-th order of k (function in the form of $k^n + a \cdot k^{n-1} + \ldots$). This indicates that the change of the value of the determinant DET with the change of the value of k is substantially proportional to $K^n$ (n-th power of k). For this reason, the value calculated according to the equation (8) is set as the provisional value Δkp of the increment Δk in this embodiment.

In STEPS 6 to 8, a limiting process is performed on the provisional value Δkp to prevent the increment Δk from becoming excessively small, as a result of which the increment Δk is determined.

In detail, in STEP 6, the provisional value Δkp of the increment Δk is compared with a predetermined lower limit Δkmin (>0). In the case where Δkp≥Δkmin, the provisional value Δkp itself is determined as the increment Δk in STEP 7. In the case where Δkp<Δkmin, Δkmin is determined as the increment Δk in STEP 8.

In so doing, the increment Δk is determined at the value calculated according to the equation (8) based on the magnitude of the error between the magnitude of the determinant DET and the lower threshold DET_L, with Δkmin as its lower limit.

The pseudo inverse matrix calculator 14 determines A* obtained by the calculation of the right side of the equation (4) using the value of the adjustment parameter k determined as described above, as the pseudo inverse matrix J* of the Jacobian matrix J.

The joint manipulation amount determinator 12 then determines the joint manipulation amount vector ↑ΔΘdmd, using the pseudo inverse matrix J* and the received basic manipulation amount vector ↑ΔXdmd.

In detail, the joint manipulation amount determinator 12 determines $\uparrow\Delta\Theta dmd$ according to the following equation (9) in this embodiment.

$$\uparrow\Delta\Theta dmd = J^* \cdot \uparrow\Delta Xdmd + (I - J^* \cdot J) \cdot \uparrow C(\theta) \quad (9)$$

The first term in the right side of the equation (9) is a term for finding such a value of $\uparrow\Delta\Theta$ that satisfies the relation of the equation (7) (i.e. a value of $\uparrow\Delta\Theta$ necessary for realizing $\uparrow\Delta Xdmd$) in the case where $\uparrow\Delta X$ in the left side of the equation (7) is the basic manipulation amount vector $\uparrow\Delta Xdmd$. The first term is calculated by multiplying the received basic manipulation amount vector $\uparrow\Delta Xdmd$ by the pseudo inverse matrix $J^*$ calculated by the pseudo inverse matrix calculator 14.

The second term in the right side of the equation (9) is a term for finding such a value of $\uparrow\Delta\Theta$ that functions so that a displacement amount of at least one joint 4 which does not affect the position of the hand 5 to be realized by $\uparrow\Delta Xdmd$ approaches an intermediate standard displacement amount between an upper limit displacement amount and a lower limit displacement amount (e.g. a median displacement amount between the upper limit displacement amount and the lower limit displacement amount), in order to prevent the displacement amount of each joint 4 from becoming too close to the upper limit or lower limit displacement amount.

In other words, the second term is a term for finding such a value of $\uparrow\Delta\Theta$ that functions so that the displacement amount of the joint 4 which can be changed without affecting the control target state (the position of the hand 5 in this embodiment) approaches the standard displacement amount, through the use of a null space (nullspace).

In this case, $\uparrow C(\theta)$ in the second term in the right side of the equation (9) is a vector (column vector of the same order as $\uparrow\Delta\Theta$) defined beforehand as a function of the displacement amounts $\theta(1)$ to $\theta(N)$ of the joints 4(1) to 4(N). In detail, $\uparrow C(\theta)$ in this embodiment is a vector having each component $c(i)$ ($i=1, 2, \ldots, N$) defined by the following equation (10).

$$c(i) = dH(\theta(i))/d\theta(i) \quad (10)$$

where $H(\theta(i)) \equiv \alpha \cdot (\theta(i) - \theta(i)s)^{2n}$

That is, each component $c(i)$ ($i=1, 2, \ldots, N$) of $\uparrow C(\theta)$ is a result of differentiating the function $H(\theta(i))$ defined in the where clause of the equation (10) with respect to $\theta(i)$. Hence, each component $c(i)$ ($i=1, 2, \ldots, N$) of $\uparrow C(\theta)$ in this embodiment is determined according to the following equation (10a).

$$c(i) = 2n \cdot \alpha \cdot (\theta(i) - \theta(i)s)^{2n-1} \quad (10a)$$

In the right side of the equation (10a), $\theta(i)s$ is a value set beforehand as the standard displacement amount of the joint 4($i$), n is an integer equal to or more than 1, e.g. n=1, and $\alpha$ is a predetermined positive constant.

Upon calculating the second term in the right side of the equation (9), the joint manipulation amount determinator 12 calculates $c(i)$ according to the equation (10a) using, as $\theta(i)$ ($i=1, 2, \ldots, N$) in the equation (10a), the measured value of the actual displacement amount $\theta(i)$ act of the joint 4($i$). Thus, $\uparrow C(\theta) (\equiv [c(1), c(2), \ldots, c(N)]^T)$ is determined.

$\uparrow C(\theta)$ determined in this way is such a value of $\uparrow\Delta\Theta$ that returns the displacement amount of each joint 4($i$) which does not affect the control of the position of the hand 5, to the standard displacement amount between the upper limit displacement amount and the lower limit displacement amount.

The joint manipulation amount determinator 12 also calculates a matrix $(I - J^* \cdot J)$ from the Jacobian matrix $J$, the pseudo inverse matrix $J^*$, and the unit matrix $I$. The joint manipulation amount determinator 12 multiples the vector $\uparrow C(\theta)$ determined in the above manner by the matrix $(I - J^* \cdot J)$, thereby calculating the second term in the right side of the equation (9).

The second term in the right side of the equation (9) as the value of $\uparrow\Delta\Theta$ functioning so that the displacement amount of the joint 4 which can be changed without affecting the manipulation of the position of the hand 5 by the basic manipulation amount vector $\uparrow\Delta Xdmd$ approaches the standard displacement amount is calculated in this way.

The joint manipulation amount determinator 12 determines the joint manipulation amount vector $\uparrow\Delta\Theta dmd$, by adding the first and second terms in the right side of the equation (9) calculated as described above.

As a result, the joint manipulation amount vector $\uparrow\Delta\Theta dmd$ indicating the correction amounts of the displacement amounts of the joints 4(1) to 4(N) for realizing the manipulation of the position of the hand 5 by the basic manipulation amount vector $\uparrow\Delta Xdmd$ is determined. In this embodiment, the component in the joint manipulation amount vector $\uparrow\Delta\Theta dmd$ corresponding to the joint 4 which does not affect the manipulation of the position of the hand 5 by the basic manipulation amount vector $\uparrow\Delta Xdmd$ is determined to be a manipulation amount (correction amount of the displacement amount) for causing the displacement amount of the joint 4 to approach the standard displacement amount.

Note that the second term in the right side of the equation (9) is not essential. The joint manipulation amount vector $\uparrow\Delta\Theta dmd$ may be determined according to the equation from which the second term is omitted. That is, the result ($=J^* \cdot \uparrow\Delta Xdmd$) of multiplying the basic manipulation amount vector $\uparrow\Delta Xdmd$ by the pseudo inverse matrix $J^*$ may be determined as the joint manipulation amount vector $\uparrow\Delta\Theta dmd$.

After executing the process of the joint manipulation amount determinator 12 as described above, the controller 9 executes the process of the joint controller 15.

The joint controller 15 receives the combination of the reference desired displacement amounts $\theta(1)cmd0$ to $\theta(N)cmd0$ of the joints 4(1) to 4(N), i.e. the reference desired displacement amount vector $\uparrow\Theta cmd0$, in the reference desired motion and the joint manipulation amount vector $\uparrow\Delta\Theta dmd$ determined by the joint manipulation amount determinator 12.

The joint controller 15 adds the received joint manipulation amount vector $\uparrow\Delta\Theta dmd$ to the received reference desired displacement amount vector $\uparrow\Theta cmd0$, to correct the reference desired displacement amount vector $\uparrow\Theta cmd0$. A joint displacement command vector $\uparrow\Theta cmd1 (=\uparrow\Theta cmd0 + \uparrow\Delta\Theta dmd)$ which is a vector $(\equiv [\theta(1)cmd1, \theta(2)cmd1, \ldots, \theta(N)cmd1]^T)$ formed by arranging the joint displacement commands $\theta(1)cmd1$ to $\theta(N)cmd1$ of the joints 4(1) to 4(N) is calculated in this way.

The joint controller 15 controls the joint actuator 6 of each joint 4($i$) via a drive circuit such as a servo amplifier not shown so that the actual displacement amount $\theta(i)$ act of each joint 4($i$) matches the corresponding component $\theta(i)cmd1$ of the joint displacement command vector $\uparrow\Theta cmd1$ determined in the above manner.

The above describes the detailed process of the controller 9 in this embodiment.

The correspondence relation between this embodiment and the present invention is as follows. The basic manipulation amount determination element, the joint manipulation amount determination element, and the joint control element in the present invention are realized respectively by the basic manipulation amount determinator 11, the joint manipulation amount determinator 12, and the joint controller 15 in this embodiment.

Moreover, the matrix determination element and the pseudo inverse matrix calculation element in the present invention are realized respectively by the Jacobian matrix determinator 13 and the pseudo inverse matrix calculator 14 in this embodiment. Furthermore, the adjustment parameter determination element in the present invention is realized by STEPS 2 to 9 in FIG. 4 in the process executed by the pseudo inverse matrix calculator 14 in FIG. 3.

The basic manipulation amount vector ↑ΔXdmd, the joint manipulation amount vector ↑ΔΘdmd, the Jacobian matrix J, and the pseudo inverse matrix J* in this embodiment respectively correspond to the basic manipulation amount vector ↑a, the joint manipulation amount vector ↑b, the matrix A, and the pseudo inverse matrix A* in the present invention.

In the embodiment described above, the pseudo inverse matrix J* of the Jacobian matrix J is calculated by the pseudo inverse matrix calculator 14, in the calculation process of the joint manipulation amount vector ↑ΔΘdmd.

Here, in the process (STEPS 2 to 9 in FIG. 4) of searching for the value of the adjustment parameter k for preventing the determinant DET from becoming excessively small, the increment Δk of the adjustment parameter k is set to a value proportional to the n-th root of the error (=DET_L−|DET|) obtained by subtracting the absolute value of the determinant DET from the lower threshold DET_L.

Therefore, the appropriate value of the adjustment parameter k such that |DET|≥DET_L can be efficiently determined in a short time in each control cycle of the controller 9, without causing a discontinuous change of the value of k.

As a result, the pseudo inverse matrix J* used for determining the joint manipulation amount vector ↑ΔΘdmd for realizing the manipulation of the position of the hand 5 by the basic manipulation amount vector ↑ΔXdmd can be smoothly changed. This allows each component of the joint manipulation amount vector ↑ΔΘdmd to be determined so as to smoothly change the displacement amount of each joint 4 of the robot 1.

Hence, the work by the robot 1 can be carried out by the smooth motion.

Second Embodiment

Figure 5:
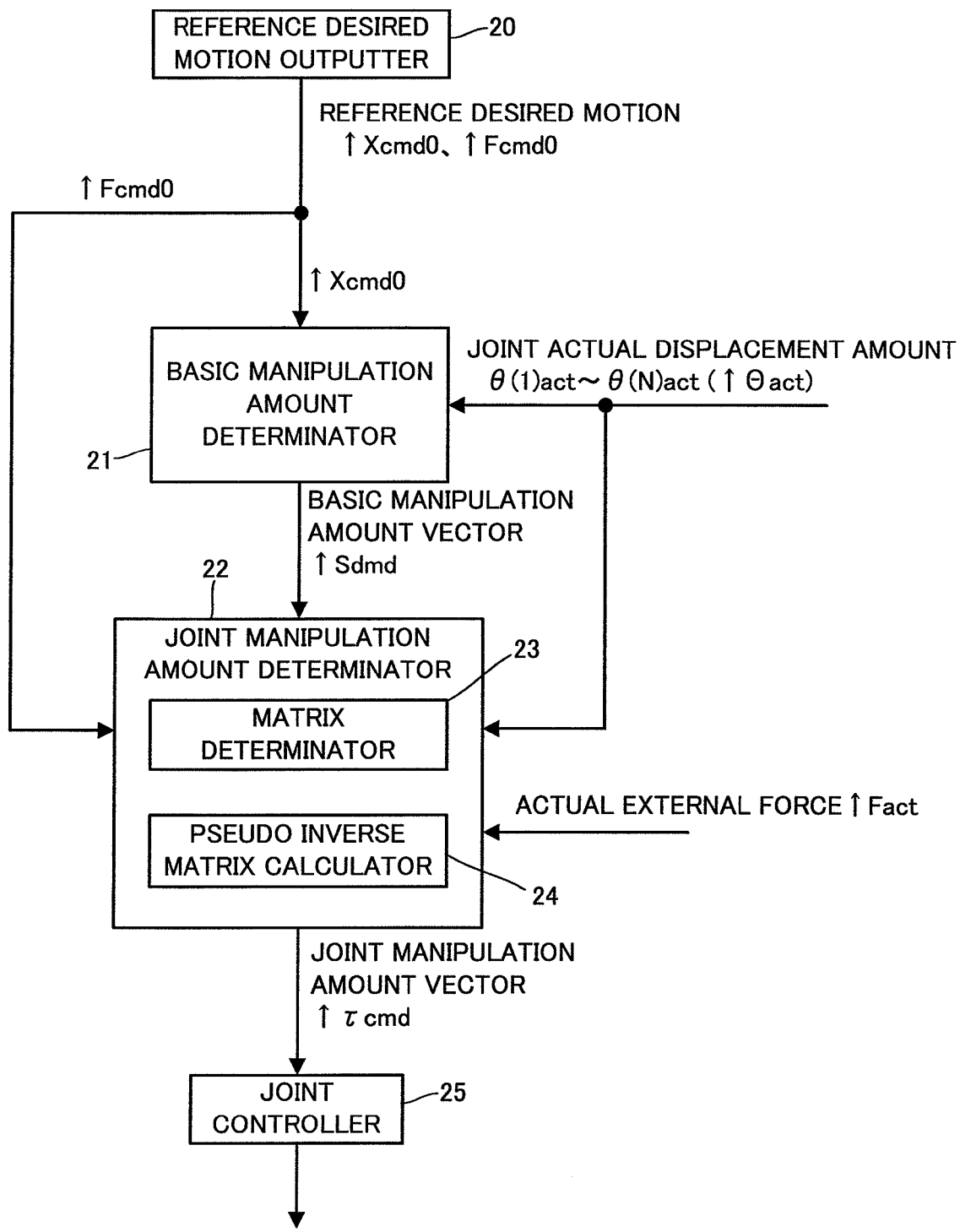
FIG. 5 is a block diagram showing functions of the controller shown in FIG. 2 in a second embodiment.

The following describes a second embodiment of the present invention with reference to FIG. 5. This embodiment differs from the first embodiment only in the process of the controller 9. Accordingly, the difference from the first embodiment is mainly described below, while omitting the description of the same matter as the first embodiment.

In the first embodiment, the position control that controls the displacement amount of each joint 4 of the robot 1 to the desired value is performed. In this embodiment, on the other hand, a desired drive force of each joint 4 of the robot 1 is determined in order to control a predetermined type of state quantity to a desired value. The joint actuator 6 of each joint 4 is controlled according to this desired drive force so that the drive force provided to the joint 4 by the joint actuator 6 follows the desired drive force.

To execute such control, the controller 9 in this embodiment includes, as functions realized by an implemented program, a hardware structure, or the like: a reference desired motion outputter 20 which outputs a reference desired motion of the robot 1; a basic manipulation amount determinator 21 which determines a basic manipulation amount vector ↑Sdmd as a control input (manipulation amount) for controlling an actual value (actual state quantity) of a predetermined type of state quantity of the robot 1 to a required desired value (i.e. for causing the actual value to follow the required desired value); a joint manipulation amount determinator 22 which determines a joint manipulation amount vector ↑τcmd as a control input (manipulation amount) for controlling a drive force of each joint 4, using the basic manipulation amount vector ↑Sdmd; and a joint controller 25 which controls each joint actuator 6 via a drive circuit not shown according to the joint manipulation amount vector ↑τcmd. By executing the processes of these functional units sequentially in predetermined control cycles, the controller 9 in this embodiment performs motion control of the robot 1.

The following describes the control process of the controller 9 in this embodiment, using an example where the robot 1 performs a work of moving the object W by the hand 5.

In each control cycle of the controller 9, the reference desired motion outputter 20 outputs the reference desired motion of the robot 1. In this embodiment, the reference desired motion is composed of the reference desired hand position ↑Xcmd0 and the reference desired hand external force ↑Fcmd0 in the reference desired motion in the first embodiment.

Next, the controller 9 executes the process of the basic manipulation amount determinator 21. The basic manipulation amount determinator 21 in this embodiment receives the reference desired hand position ↑Xcmd0 from among the constituents of the reference desired motion output from the reference desired motion outputter 20, and also receives the measured values (measured value of the actual displacement amount vector ↑Θact) of the actual displacement amounts θ(1)act to θ(N)act of the joints 4(1) to 4(N) indicated by the output of the joint displacement sensor 7.

The basic manipulation amount determinator 21 determines the basic manipulation amount vector ↑Sdmd for controlling the actual value (actual state quantity) of the predetermined type of state quantity of the robot 1 to the required desired value (i.e. for causing the actual value to follow the required desired value), using the received data.

In this embodiment, for example, the position ↑X of the hand 5 is used as the predetermined type of state quantity to be controlled by the basic manipulation amount vector ↑Sdmd. The basic manipulation amount vector ↑Sdmd determined by the basic manipulation amount determinator 21 is a control input defining a translational force to be applied from the robot 1 to the hand 5 in order to realize the motion (reference desired motion) of the hand 5 defined by the time series of the reference desired hand position ↑Xcmd0. The basic manipulation amount vector ↑Sdmd is expressed as a three-component vector in the inertial coordinate system.

In this embodiment, the basic manipulation amount determinator 21 determines the basic manipulation amount vector ↑Sdmd as a control input (manipulation amount) so that the reference desired motion of the hand 5 is kinetically feasible. The basic manipulation amount determinator 21 also determines the basic manipulation amount vector ↑Sdmd so that the displacement amount of the joint 4 approaches the standard displacement amount within a range where the realization of the reference desired motion of the hand 5 is not affected, through the use of the above-mentioned null space.

In detail, the basic manipulation amount determinator 21 determines the basic manipulation amount vector ↑Sdmd by adding, as shown by the following equation (11), a manipulation amount component ↑Sa(=↑Sa1+↑Sa2) determined according to the following equations (11a) and (11b) and a manipulation amount component ↑Sb determined according to the following equation (11c).

$$\uparrow Sdmd = \uparrow Sa + \uparrow Sb \quad (11)$$

where $$\uparrow Sa = \uparrow Sa1 + \uparrow Sa2 \quad (11a)$$

$$\uparrow Sa1 = \Lambda \cdot (\uparrow Xcmd0'' + Kp2 \cdot (\uparrow Xcmd0 - \uparrow Xact) + Kv2 \cdot (\uparrow Xcmd0' - \uparrow Xact')) \quad (11b)$$

$$\uparrow Sb = (I - J\# \cdot J)^T \cdot (M \cdot \uparrow C(\theta)) \quad (11c)$$

$\Lambda$ and $J\#$ are matrices defined respectively by the following equations (12a) and (12b).

$$\Lambda \equiv (J \cdot M^{-1} \cdot J^T)^T \quad (12a)$$

$$j\# \equiv (M^{-1})^T \cdot J^T \cdot (J \cdot M^{-1} \cdot J^T)^* \quad (12b)$$

The manipulation amount component ↑Sa corresponds to a translational external force to be applied to the robot 1 in order to kinetically realize the reference desired motion of the hand 5. Here, ↑Sa is a manipulation amount component obtained by adding, according to the equation (11a), the manipulation amount component ↑Sa1 corresponding to a required inertial force and the manipulation amount component ↑Sa2 for compensating for any influence on the motion of the hand 5 by gravity acting on the robot 1 or any influence on the motion of the hand 5 by gravity and centrifugal and Coriolis forces.

The manipulation amount component ↑Sa1 corresponding to the required inertial force is calculated according to the equation (11b). The matrix $\Lambda$ necessary for the calculation of the equation (11b) is calculated from the Jacobian matrix J (Jacobian matrix J representing the relation of the linear map between the minute change amount ↑ΔΘ per unit time of the joint displacement amount vector ↑Θ and the change amount ↑ΔX per unit time of the position ↑X of the hand 5) described in the first embodiment and an inertia matrix M, according to the definition of the equation (12a).

The Jacobian matrix J is determined by the same process as the process of the Jacobian matrix determinator 13 in the first embodiment.

The inertia matrix M is more specifically a matrix set beforehand so that a result of multiplying, by $(-1) \cdot M (=-M)$, a vector (i.e. a second order derivative of the joint displacement amount vector ↑Θ) formed by arranging second order derivatives (angular velocities in this embodiment) of the displacement amounts of the joints 4(1) to 4(N) is an inertial force (inertial force moment in this embodiment) of each of the joints 4(1) to 4(N). The inertia matrix M is a diagonal matrix. $M^{-1}$ is therefore a diagonal matrix whose diagonal components are the inverses of the diagonal components of M.

↑Xcmd0" and ↑Xcmd0' necessary for the calculation of the equation (11b) are respectively a second order derivative and a first order derivative of the reference desired hand position ↑Xcmd0. ↑Xcmd0" and ↑Xcmd0' are each calculated from the time series of ↑Xcmd0.

↑Xact (actual position of the hand 5) necessary for the calculation of the equation (11b) is derived from the measured value of the actual displacement amount vector ↑Θact by geometric calculation. Further, a temporal change rate of ↑Xact is calculated as ↑Xact'.

In the equation (11b), Kp2 and Kv2 are respectively a proportional gain and a derivative gain. Kp2 and Kv2 are each a predetermined scalar or diagonal matrix.

The manipulation amount component ↑Sa1 is obtained by the calculation of the right side of the equation (11b), using the matrix $\Lambda$ determined as described above and the like. In this embodiment, the value (value by which $\Lambda$ is multiplied) inside the parentheses in the right side of the equation (11b) is a result of adding, to the second order derivative ↑Xcmd0" of ↑Xcmd0, a proportional term and a derivative term as feedback manipulation amounts for causing ↑Xact to follow ↑Xcmd0 by the PD law.

The manipulation amount component ↑Sa2 is calculated using the measured value of the actual displacement amount vector ↑Θact and its temporal change rate, based on a kinetic model of the robot 1.

The result of adding the manipulation amount components ↑Sa1 and ↑Sa2 calculated in this way is determined as the manipulation amount component ↑Sa corresponding to the translational external force for kinetically realizing the reference desired motion of the hand 5.

Note that the third term or the second and third terms in the right side of the equation (11b) may be omitted in the calculation of ↑Sa1.

The manipulation amount component ↑Sb necessary for the calculation of the equation (11) is a manipulation amount component functioning so that the displacement amount of the joint 4 which can be changed without affecting the control target state (the position of the hand 5 in this embodiment) approaches the standard displacement amount (predetermined median displacement amount between the upper limit displacement amount and the lower limit displacement amount), through the use of the null space (nullspace).

The manipulation amount component ↑Sb is calculated according to the equation (11c). ↑C(θ) necessary for the calculation of the equation (11c) in this embodiment is the same as that described in the first embodiment. That is, each component c(i) (i=1, 2, ..., N) of ↑C(θ) is determined based on the error between the measured value of the actual displacement amount of each joint 4(i) and the standard displacement amount, according to the equation (10a).

J and M are the same as those described with regard to the process of calculating the matrix $\Lambda$ in the equation (11b).

J# is calculated from the Jacobian matrix J and the inertia matrix M, according to the definition of the equation (12b).

In the equation (12b), $(J \cdot M^{-1} \cdot J^T)^*$ is a pseudo inverse matrix of the matrix $(J \cdot M^{-1} \cdot J^T)$. This pseudo inverse matrix is calculated by the same process as in the case of calculating J* in the first embodiment.

Figure 6:
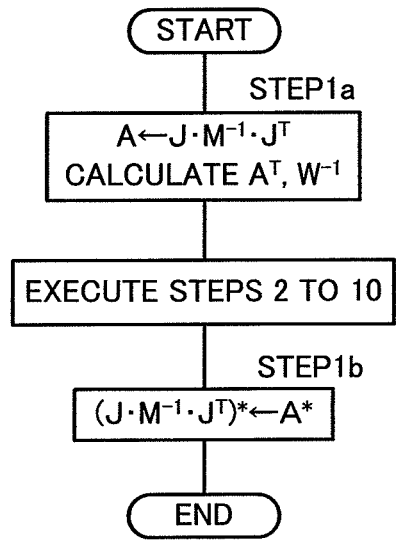
FIG. 6 is a flowchart showing a process in a basic manipulation amount determinator shown in FIG. 5.

In detail, the basic manipulation amount determinator 21 calculates the pseudo inverse matrix $(J \cdot M^{-1} \cdot J^T)^*$, by executing the process of the flowchart in FIG. 6. First, in STEP 1a, the matrix $(J \cdot M^{-1} \cdot J^T)$ is substituted for the matrix A in the equation (4), and the transposed matrix $A^T$ of the matrix A and the inverse matrix $W^{-1}$ of the weight coefficient matrix W are calculated. The weight coefficient matrix W is a diagonal matrix set beforehand as in the first embodiment.

Next, the same process as STEPS 2 to 10 (including the exploratory determination process of the adjustment parameter k) in FIG. 4 described in the first embodiment is executed to calculate the pseudo inverse matrix A*.

In STEP 1b, the pseudo inverse matrix A* is determined as the pseudo inverse matrix $(J \cdot M^{-1} \cdot J^T)^*$ of the matrix $(J \cdot M^{-1} \cdot J^T)$.

The basic manipulation amount determinator 21 obtains the manipulation amount component ↑Sb by the calculation of the equation (11c), using the pseudo inverse matrix $(J \cdot M^{-1} \cdot J^T)^*$ calculated in this way.

The basic manipulation amount determinator 21 then determines the result of adding the manipulation amount components ↑Sa and ↑Sb calculated as described above, as the basic manipulation amount vector ↑Sdmd.

Here, the manipulation amount component ↑Sa itself may be determined as the basic manipulation amount vector ↑Sdmd, while omitting the manipulation amount component ↑Sb.

Moreover, the desired value of the position ↑X of the hand 5 may be dynamically shifted from ↑Xcmd0 as needed.

Though this embodiment describes the case where the predetermined type of state quantity to be controlled by the basic manipulation amount vector ↑Sdmd is the position ↑X of the hand 5, the state quantity may include the posture of the hand 5.

After executing the process of the basic manipulation amount determinator 21 as described above, the controller 9 executes the process of the joint manipulation amount determinator 22.

The joint manipulation amount determinator 22 receives the measured values (measured value of the actual displacement amount vector ↑Θact) of the actual displacement amounts θ(1)act to θ(N)act of the joints 4(1) to 4(N) indicated by the output of the joint displacement sensor 7 for each joint 4, the measured value of the actual external force ↑Fact (actual translational external force acting on the hand 5) indicated by the output of the force sensor 8, the basic manipulation amount vector ↑Sdmd determined by the basic manipulation amount determinator 21, and the reference desired hand external force ↑Fcmd0 in the reference desired motion.

The joint manipulation amount determinator 22 determines the joint manipulation amount vector ↑τcmd for controlling the drive force of each of the joints 4(1) to 4(N), using the received data. The joint manipulation amount vector ↑τcmd in this embodiment is a vector ($\equiv[\tau(1)\text{cmd}, \tau(2)\text{cmd}, \ldots, \tau(N)\text{cmd}]^T$) formed by arranging the desired values $\tau(1)$cmd to $\tau(N)$cmd of the drive forces (torques in this embodiment) of the N joints 4(1) to 4(N) of the robot 1.

The joint manipulation amount determinator 22 includes a matrix determinator 23 and a pseudo inverse matrix calculator 24, as components of its process. The joint manipulation amount determinator 22 first executes the processes of the matrix determinator 23 and the pseudo inverse matrix calculator 24 in sequence.

The matrix determinator 23 executes a process of determining a matrix Js that represents, by the following equation (13), a relation of a linear map between a joint drive force vector ↑τ which is a vector (column vector) formed by arranging the drive forces τ(1) to τ(N) of the joints 4(1) to 4(N) and a force (three-component translational force vector in this embodiment) ↑S represented by the basic manipulation amount vector ↑Sdmd.

$$\uparrow S = Js \cdot \uparrow \tau$$

$$(= J\#^T \cdot \uparrow \tau) \quad (13)$$

The matrix Js matches a transposed matrix $J\#^T$ of the matrix J# defined by the equation (12b).

In this embodiment, the matrix determinator 23 determines the transposed matrix $J\#^T$ of the matrix J# calculated earlier by the calculation process of the basic manipulation amount determinator 21, as the matrix Js. Alternatively, the matrix determinator 23 by itself may calculate J# according to the definition of the equation (12b) and then calculate its transposed matrix.

A pseudo inverse matrix $(J\#^T)^*$ of the matrix Js $(=J\#^T)$ determined in this way is then calculated by the process of the pseudo inverse matrix calculator 24.

The pseudo inverse matrix $(J\#^T)^*$ is calculated by the same process as in the case of calculating J* in the first embodiment.

Figure 7:
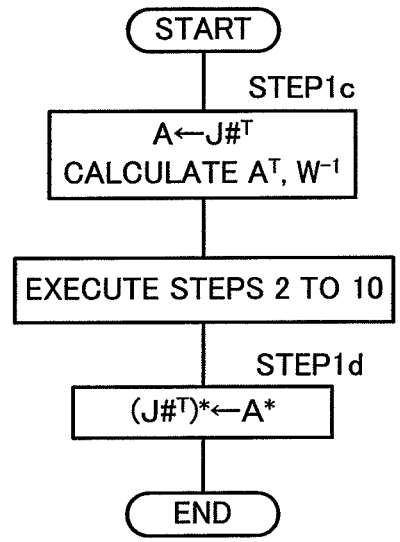
FIG. 7 is a flowchart showing a process in a pseudo inverse matrix calculator shown in FIG. 5.

In detail, the pseudo inverse matrix calculator 24 calculates the pseudo inverse matrix $(J\#^T)^*$ by executing the process of the flowchart in FIG. 7. First, in STEP 1c, the matrix $J\#^T$ (=Js) is substituted for the matrix A in the equation (4), and the transposed matrix $A^T$ of the matrix A and the inverse matrix $W^{-1}$ of the weight coefficient matrix W are calculated. The weight coefficient matrix W is a diagonal matrix set beforehand as in the first embodiment.

Next, the same process as STEPS 2 to 10 (including the exploratory determination process of the adjustment parameter k) in FIG. 4 described in the first embodiment is executed to calculate the pseudo inverse matrix A*.

In STEP 1d, the pseudo inverse matrix A* is determined as the pseudo inverse matrix $(J\#^T)^*$ of $J\#^T$ (=Js).

After the pseudo inverse matrix $(J\#^T)^*$ is calculated in the above manner, the joint manipulation amount determinator 22 determines the joint manipulation amount vector ↑τcmd, using the pseudo inverse matrix $(J\#^T)^*$, the received basic manipulation amount vector ↑Sdmd, the reference desired hand external force ↑Fcmd0, and the measured value of the actual external force ↑Fact acting on the hand 5.

In detail, the joint manipulation amount determinator 22 in this embodiment determines the joint manipulation amount vector ↑τcmd by adding, as shown by the following equation (14), manipulation amount components ↑τa and ↑τb determined according to the following equations (14a) and (14b).

$$\uparrow \tau cmd = \uparrow \tau a + \uparrow \tau b \quad (14)$$

where $$\uparrow \tau a = (J\#^T)^* \cdot \uparrow Sdmd \quad (14a)$$

$$\uparrow \tau b = J^T \cdot (\uparrow Fcmd0 + Kc2 \cdot (\uparrow Fcmd0 - \uparrow Fact) + Ke2 \cdot \int (\uparrow Fcmd0 - \uparrow Fact) dt) \quad (14b)$$

The manipulation amount component ↑τa calculated according to the equation (14a) is a manipulation amount for causing the actual position ↑Xact of the hand 5 to follow the reference desired hand position ↑Xcmd0. In this embodiment, the manipulation amount component ↑τa also includes a manipulation amount component for causing the displacement amount of the joint 4 which can be moved without affecting the control of the actual position τXact of the hand 5, to approach the standard displacement amount.

↑τa is calculated by multiplying the basic manipulation amount vector ↑Sdmd by the pseudo inverse matrix $(J\#^T)^*$.

The manipulation amount component ↑τb calculated according to the equation (14b) is a manipulation amount that is added to ↑τa for causing the actual external force ↑Fact acting on the hand 5 from the object W to follow the reference desired hand external force ↑Fcmd0.

Here, the value (value by which $J^T$ is multiplied) inside the parentheses in the right side of the equation (14b) is a result of adding, to the reference desired hand external force ↑Fcmd0, a proportional term and an integral term as feedback manipulation amounts for causing ↑Fact (measured value) to follow ↑Fcmd0 by the PI law (proportional-integral law). Multiplying this value by the transposed matrix $J^T$ of the Jacobian matrix J yields the manipulation amount component ↑τb.

A proportional gain Kc2 and an integral gain Ke2 used for the calculation of the equation (14b) are each a predetermined scalar or diagonal matrix.

The joint manipulation amount determinator 22 determines the result of adding the manipulation amount components ↑τa and ↑τb determined as described above, as the joint manipulation amount vector ↑τcmd.

Thus, the joint manipulation amount vector ↑τcmd is determined as a manipulation amount vector functioning so that the actual position ↑Xact and the actual external force ↑Fact of the hand 5 respectively follow the reference desired hand position ↑Xcmd0 and the reference desired hand external force ↑Fcmd0.

Note that the third term or the second and third terms in the right side of the equation (14b) may be omitted in the calculation of the manipulation amount component ↑τb of the joint manipulation amount vector ↑τcmd. Moreover, the desired value of the external force ↑F may be dynamically shifted from ↑Fcmd0 as needed.

After executing the process of the joint manipulation amount determinator 22 as described above, the controller 9 executes the process of the joint controller 25.

The joint controller 25 receives the joint manipulation amount vector ↑τcmd determined by the joint manipulation amount determinator 22.

The joint controller 25 controls the drive force of the joint actuator 6 of each joint 4(i) via a drive circuit not shown so that the actual drive force of each joint 4(i) matches the corresponding component τ(i)cmd (i=1, 2, . . . , N) of the received joint manipulation amount vector ↑τcmd.

The above describes the detailed process of the controller 9 in this embodiment.

The correspondence relation between this embodiment and the present invention is as follows. The basic manipulation amount determination element, the joint manipulation amount determination element, and the joint control element in the present invention are realized respectively by the basic manipulation amount determinator 21, the joint manipulation amount determinator 22, and the joint controller 25 in this embodiment.

Moreover, the matrix determination element and the pseudo inverse matrix calculation element in the present invention are realized respectively by the matrix determinator 23 and the pseudo inverse matrix calculator 24 in this embodiment. Furthermore, the adjustment parameter determination element in the present invention is realized by STEPS 2 to 9 in the process executed by the pseudo inverse matrix calculator 24 in FIG. 7.

The basic manipulation amount vector ↑Sdmd, the manipulation amount component ↑τa of the joint manipulation amount vector ↑τdmd, the matrix Js ($=J\#^T$), and the pseudo inverse matrix $(J\#^T)^*$ in this embodiment respectively correspond to the basic manipulation amount vector ↑a, the joint manipulation amount vector ↑b, the matrix A, and the pseudo inverse matrix A* in the present invention.

In addition, the joint manipulation amount determination element in the fifth invention can be regarded as being realized by the combined process of the basic manipulation amount determinator 21 and the joint manipulation amount determinator 22 in this embodiment. In such a case, STEPS 2 to 9 in the process executed by the basic manipulation amount determinator 21 in FIG. 6 and STEPS 2 to 9 in the process executed by the pseudo inverse matrix calculator 24 in the joint manipulation amount determinator 22 in FIG. 7 each correspond to the adjustment parameter determination element in the fifth invention. Here, not only $(J\#^T)^*$ but also $(J \cdot M^{-1} \cdot J^T)^*$ corresponds to the pseudo inverse matrix A* in the fifth invention.

In the embodiment described above, in the calculation of each of the pseudo inverse matrices $(J\#^T)^*$ and $(J \cdot M^{-1} \cdot J^T)^*$, the increment Δk of the adjustment parameter k is set to a value proportional to the n-th root of the error (=DET_L−|DET|) obtained by subtracting the absolute value of the determinant DET from the lower threshold DET_L.

Therefore, in the calculation of each of the pseudo inverse matrices $(J\#^T)^*$ and $(J \cdot M^{-1} \cdot J^T)^*$, the appropriate value of the adjustment parameter k such that |DET|≥DET_L can be efficiently determined in a short time in each control cycle of the controller 9, without causing a discontinuous change of the value of k. This allows each component of the joint manipulation amount vector ↑τdmd to be determined so as to smoothly change the drive force of each joint 4 of the robot 1.

Hence, the work by the robot 1 can be carried out by the smooth motion.

Though each of the embodiments described above uses an example of motion control of the robot 1 fixed in place, the robot to which the present invention is applied is not limited to a robot fixed in place, and may be a mobile robot such as a legged mobile robot.

What is claimed is:

1. A robot controller for a robot which includes a plurality of link elements connected together via a plurality of joints, the robot controller comprising:
a basic manipulation amount determination element configured to sequentially determine a basic manipulation amount vector ↑a according to at least a desired value of a predetermined type of state quantity of the robot, the basic manipulation amount vector ↑a being a vector representing a manipulation amount for controlling the predetermined type of state quantity of the robot to the desired value, and being composed of M components where M is an integer equal to or more than 1;
a joint manipulation amount determination element configured to sequentially determine a joint manipulation amount vector ↑b by multiplying the determined basic manipulation amount vector ↑a by a pseudo inverse matrix A* of a matrix A defined by the following equation (3), the joint manipulation amount vector ↑b being a vector representing a manipulation amount for controlling a motion state of each joint of the robot, being composed of N components where N is an integer such that N≥M, and having a relation of a linear map shown by the following equation (3) with the basic manipulation amount vector ↑a, the equation (3) being $$\uparrow a = A \cdot \uparrow b \quad (3); \text{ and}$$

a joint control element configured to control the motion state of each joint of the robot via an actuator, according to at least the determined joint manipulation amount vector ↑b,
wherein the joint manipulation amount determination element includes:
a matrix determination element configured to determine the matrix A according to at least a current motion state of each joint of the robot;
a pseudo inverse matrix calculation element configured to calculate the pseudo inverse matrix A* according to the following equation (4), using the determined matrix A, a weight coefficient matrix W set beforehand which is a diagonal matrix, and a value of an adjustment parameter k where k is a real number equal to or more than 0; and
an adjustment parameter determination element configured to determine the value of the adjustment parameter k used for calculation of the equation (4) so that an absolute value of a determinant DET expressed by the following equation (5) is equal to or more than a predetermined threshold, the equations (4) and (5) being respectively $$A^* = W^{-1} \cdot A^T \cdot (A \cdot W^{-1} \cdot A^T + k \cdot I)^{-1} \quad (4)$$

$$DET = det(A \cdot W^{-1} \cdot A^T + k \cdot I) \quad (5), \text{ and}$$

wherein the adjustment parameter determination element is configured to: repeatedly perform a process of setting a provisional value of the adjustment parameter k by gradually increasing the provisional value from a predetermined initial value, calculating the determinant DET using the set provisional value, and determining whether or not the absolute value of the calculated determinant DET is equal to or more than the predetermined threshold; determine the provisional value of the adjustment parameter k in the case where a result of the determination is true, as the value of the adjustment parameter k used for the calculation of the equation (4); and set an increment of the provisional value of the adjustment parameter k in the case where the result of the determination is false, to a value proportional to an n-th root of an absolute value of an error between the absolute value of the determinant DET calculated using the provisional value before the increment and the predetermined threshold, where n is an order of $A \cdot W^{-1} \cdot A^T$.

2. The robot controller according to claim 1, wherein the predetermined type of state quantity includes at least one of a motion state quantity of a specific part of the robot and an external force acting on the robot.

3. The robot controller according to claim 1, wherein the basic manipulation amount vector ↑a is a vector composed of a manipulation amount component defining a motion state of a specific part of the robot, and the joint manipulation amount vector ↑b is a vector composed of a manipulation amount component defining a displacement amount of each joint of the robot.

4. The robot controller according to claim 1, wherein the basic manipulation amount vector ↑a is a vector composed of a manipulation amount component defining an external force acting on the robot, and the joint manipulation amount vector ↑b is a vector composed of a manipulation amount component defining a drive force of each joint of the robot.

5. A robot controller for a robot which includes a plurality of link elements connected together via a plurality of joints, the robot controller comprising:

a joint manipulation amount determination element configured to sequentially determine a manipulation amount for controlling a motion state of each joint of the robot, by a calculation process that uses a pseudo inverse matrix A* of a matrix A representing a linear map; and a joint control element configured to control the motion state of each joint of the robot via an actuator, according to the determined manipulation amount, wherein the joint manipulation amount determination element includes:

a pseudo inverse matrix calculation element configured to calculate the pseudo inverse matrix A* according to the following equation (4), using the matrix A, a weight coefficient matrix W set beforehand which is a diagonal matrix, and a value of an adjustment parameter k where k is a real number equal to or more than 0; and an adjustment parameter determination element configured to determine the value of the adjustment parameter k used for calculation of the equation (4) so that an absolute value of a determinant DET expressed by the following equation (5) is equal to or more than a predetermined threshold, the equations (4) and (5) being respectively $$A^* = W^{-1} \cdot A^T \cdot (A \cdot W^{-1} \cdot A^T + k \cdot I)^{-1} \quad (4)$$

$$DET = det(A \cdot W^{-1} \cdot A^T + k \cdot I) \quad (5), \text{ and}$$

wherein the adjustment parameter determination element is configured to: repeatedly perform a process of setting a provisional value of the adjustment parameter k by gradually increasing the provisional value from a predetermined initial value, calculating the determinant DET using the set provisional value, and determining whether or not the absolute value of the calculated determinant DET is equal to or more than the predetermined threshold; determine the provisional value of the adjustment parameter k in the case where a result of the determination is true, as the value of the adjustment parameter k used for the calculation of the equation (4); and set an increment of the provisional value of the adjustment parameter k in the case where the result of the determination is false, to a value proportional to an n-th root of an absolute value of an error between the absolute value of the determinant DET calculated using the provisional value before the increment and the predetermined threshold, where n is an order of $A \cdot W^{-1} \cdot A^T$.

\* \* \* \* \*